April 14, 1931.  W. E. BUNDY  1,800,208
INCUBATOR
Filed Aug. 29, 1924  5 Sheets-Sheet 1

INVENTOR.
WHITNEY E. BUNDY,
BY Toulmin & Toulmin,
ATTORNEYS.

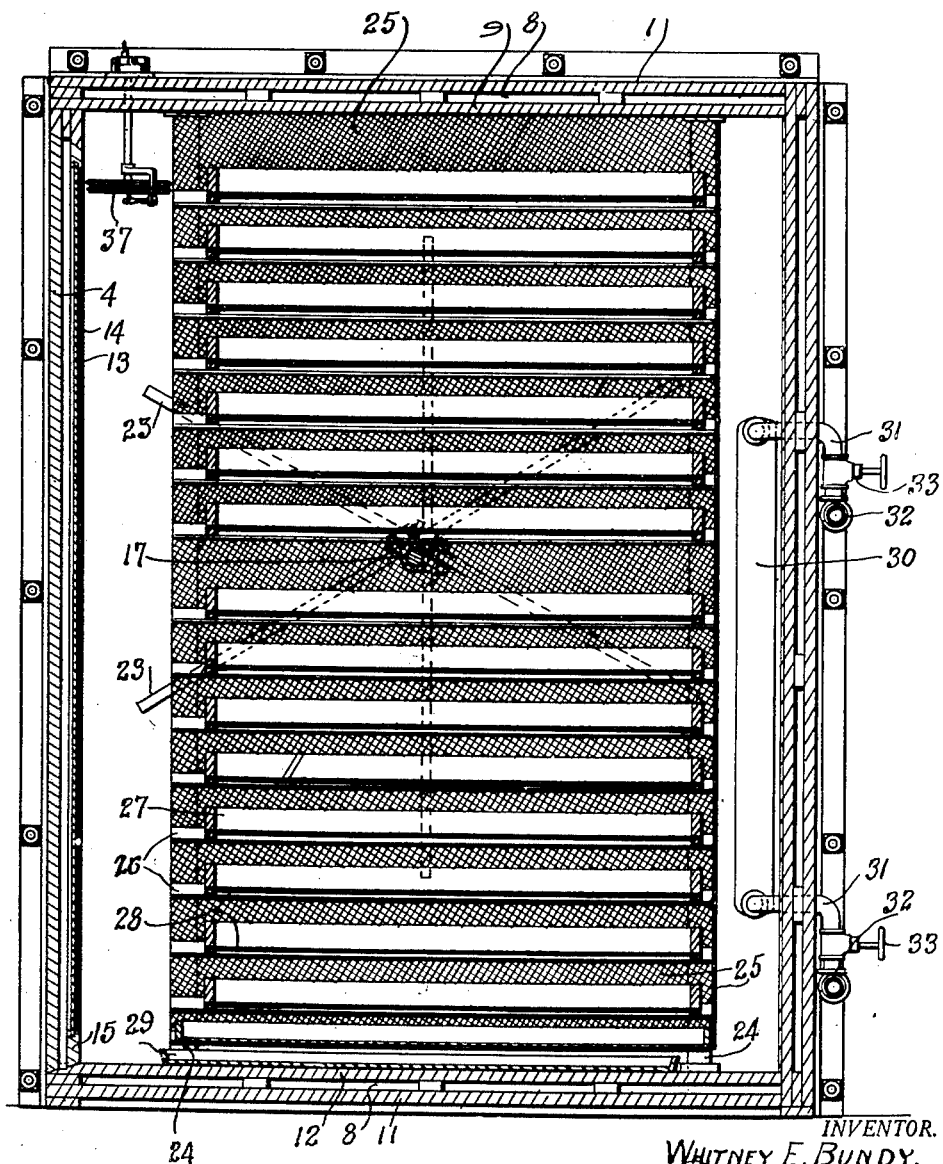

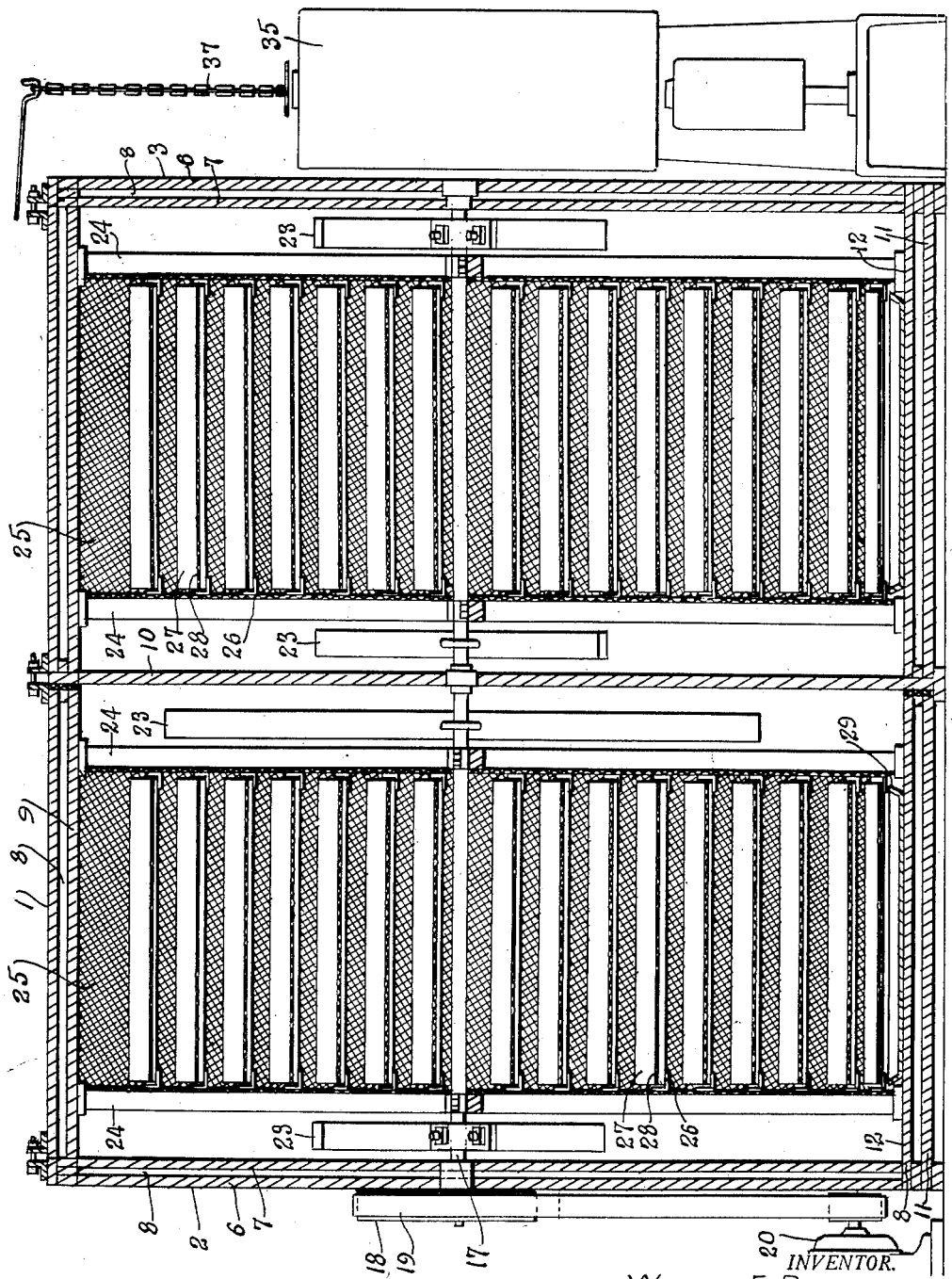

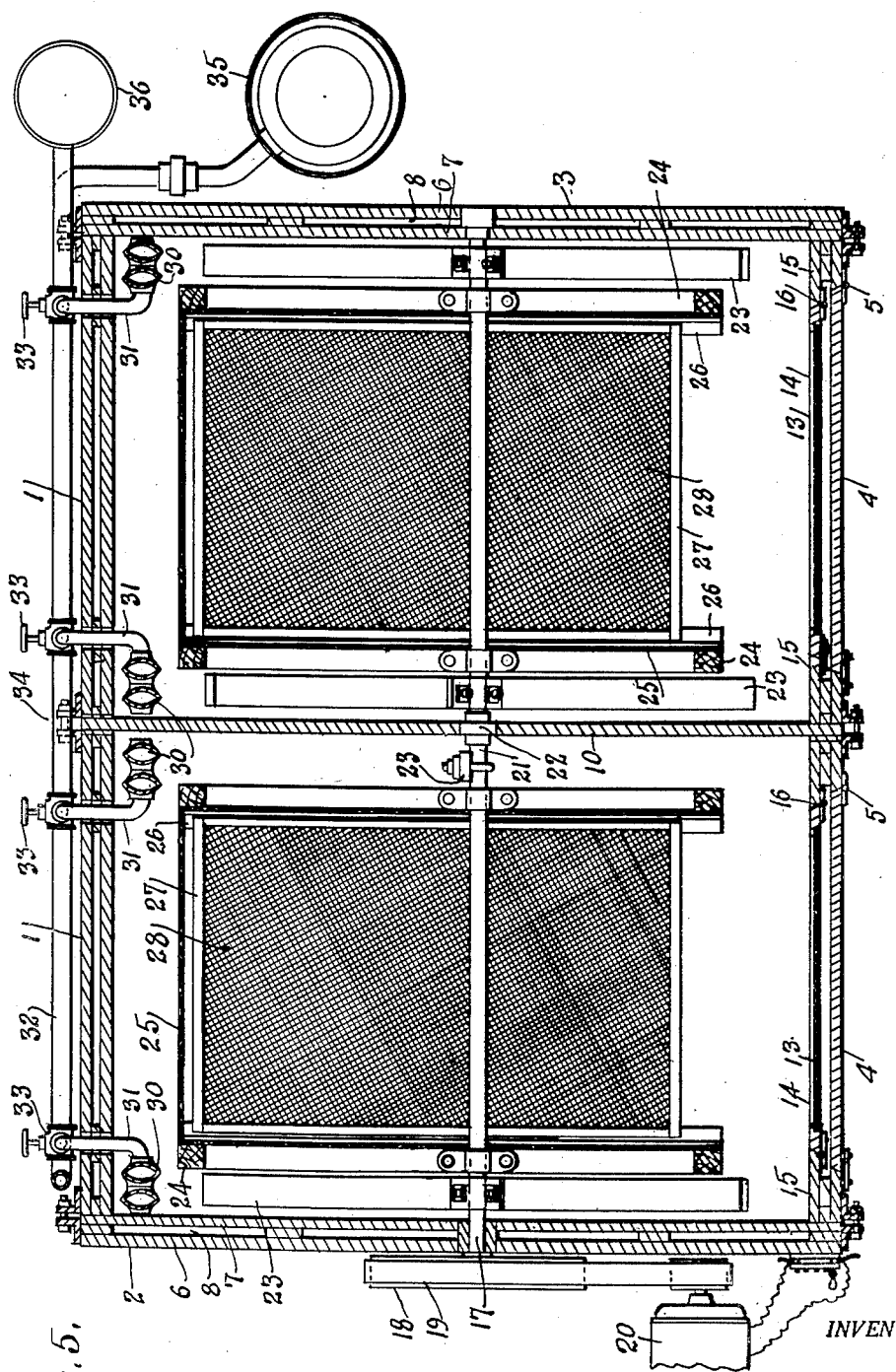

April 14, 1931. W. E. BUNDY 1,800,208
INCUBATOR
Filed Aug. 29, 1924 5 Sheets-Sheet 5
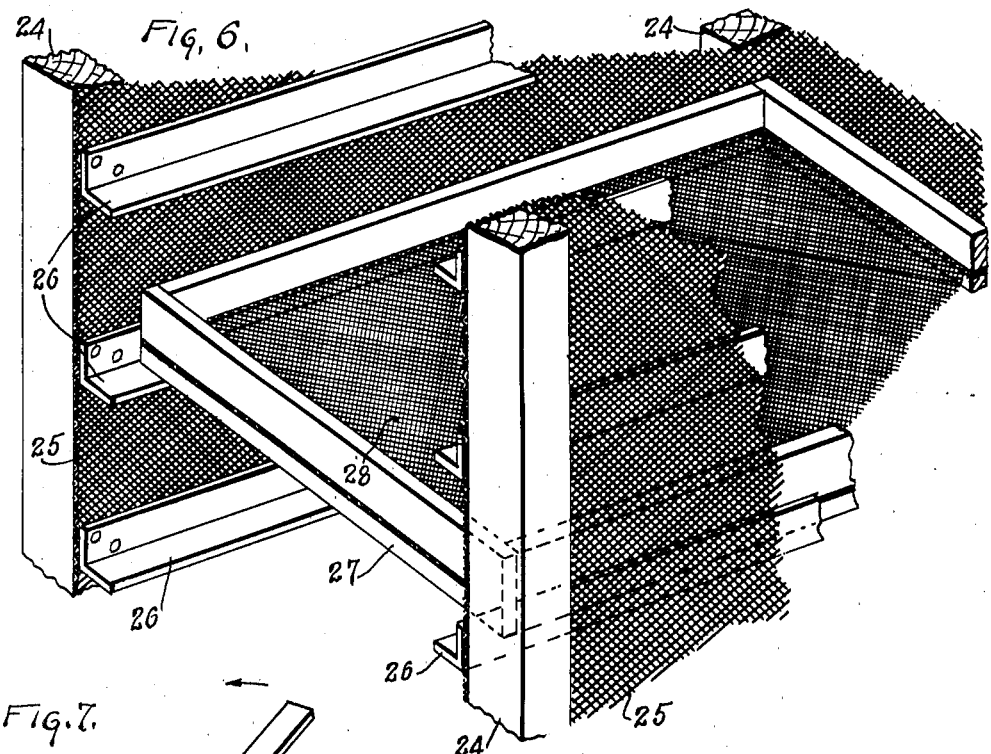
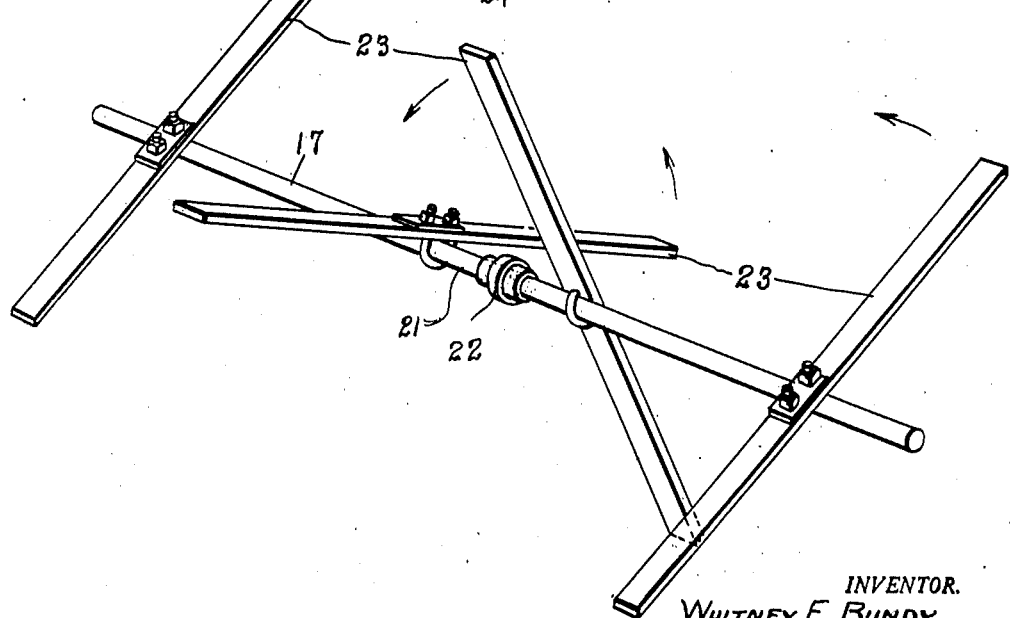
INVENTOR.
WHITNEY E. BUNDY,
BY
ATTORNEYS.

Patented Apr. 14, 1931

1,800,208

UNITED STATES PATENT OFFICE

WHITNEY E. BUNDY, OF DONNELLSVILLE, OHIO

INCUBATOR

Application filed August 29, 1924. Serial No. 734,994.

My invention relates to incubators.

It is the object of my invention to provide a highly efficient incubator.

It is an additional object of my invention to provide an incubator which may be furnished in sections and the sections expanded to expand the capacity of the incubator without modifying the operation of the incubator or disturbing its mechanism.

It is a further object of my invention to provide an incubator in which each compartment will be a separate unit in itself to assist in maintaining the temperature at a uniform point throughout the entire section.

It is a further object to cut down drafts which might cause a variation in temperature. It is an additional object to provide a system of radiation and air circulation which will insure uniform temperatures in each compartment. It is an additional object to provide such an incubator which may employ the same heating apparatus and a unit actuating mechanism for the fans irrespective of the number of the sections utilized.

It is an additional object to provide means of preventing the chicks from coming in contact with the blades of the fan as they are hatched or from falling from the trays.

It is still a further object to provide means of readily inspecting the interior of each unit without disturbing the temperature of such unit.

It is an additional object to provide for the handling of a plurality of groups of eggs in a single compartment.

With these objects in view, my invention is illustrated by the following drawings:

Figure 3 is a vertical section on the line 3—3 of Figure 1.

Figure 4 is a section on the line 4—4 of Figure 2.

Figure 5 is a section on the line 5—5 of Figure 2.

Figure 6 is a perspective of the interior of one of the units with the side walls cut away in order to show the location of the trays, their supports, and the surrounding screens.

Figure 7 is a perspective of the operating shaft which carries a plurality of spaced fan blades.

Figure 1:
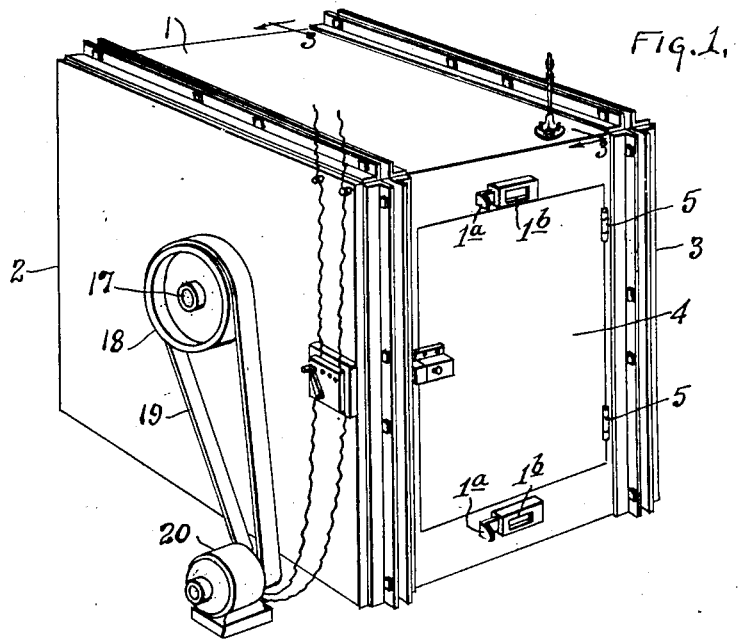
Figure 1 is a perspective of one section of my incubator.
Figure 2:
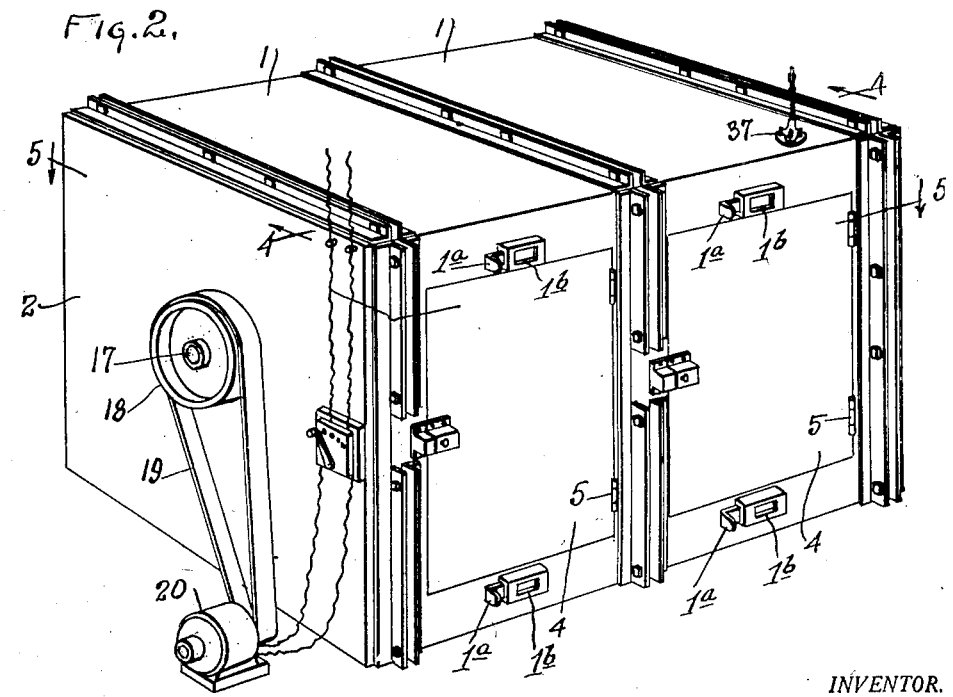
Figure 2 is a perspective of a pair of sections showing the appearance when one section is added to another.

Referring to the drawings in detail it will be observed that each unit is a rectangular box-shaped structure which consists of insulated walls with a door, heating apparatus, fan mechanism and a plurality of screened trays.

1 is the outside top wall, 2 one of the side sections, and 3 another side section. 4 represents a door, hinged at 5 to the front of the box or container.

Ventilation openings through which air pulsates or breathes are provided at the top and bottom of the incubator in any part thereof as may be desired but I have shown slides 1a controlling openings 1b in the front wall of the incubator, at the top and bottom of the wall.

These sides 2 and 3 consist of outer and inner walls such as the boards or planks 6 and 7 which are separated by a space 8 which forms an insulating space so that a uniform temperature may be maintained within the container or compartment. The top is likewise formed with a space 8 and an inner wall or board 9. On the side which is to be built onto by additional sections when desired, there is usually provided an additional board or wall 10 which is located just inside the outer double wall structure heretofore described, and designated 6 and 7.

The bottom of the casing or compartment is provided with outer and inner walls 11 and 12 with a space 8 therebetween. In short, all the walls of the structure are thus double. A front door 4 is solid but is separated by a space 8 from the inner door which consists of a glass 13 for inspection purposes and a frame 14 mounted in a door jamb 15. This door is hinged at 16. Upon opening the outside door 4 the interior of the container may be viewed without admitting any of the outside atmosphere and chilling the eggs.

A driving shaft 17 is mounted transversely through the compartment. It is driven at one end by a pulley 18, a belt 19 and a motor 20. Any desired form of motive power may be used. The other end of the shaft, as at 21, is provided with a coupling 22 for attaching the shaft to it of the next succeeding unit. The dividing wall 10 also serves to assist in supporting this shaft and maintaining it in alignment. Mounted on the shaft are a number of blades 23 which are mounted at an angle to one another and closely adjacent the cage in which is located the frame supporting the trays carrying the eggs. By placing these blades at angles to one another on the shaft, the air is caused to circulate in irregular paths to thus insure the thorough mixing of the air and a homogeneous condition of the air with uniform temperature. Between these blades 23 there is located a screen casing consisting of the frame members 24 and the screens 25. These frame members are provided on the inside of the screens with a series of ledges 26 in pairs to act as slides or supports for the frames 27 of the trays. The bottom of these trays are also screened as at 28 to support the eggs and the chicks when they hatch. These trays may be moved inwardly or outwardly at the will of the operator. At the base of a stack of trays is usually placed a water pan 29 which is useful in controlling the humidity of the atmosphere. The trays may be taken out or placed in by opening the doors heretofore described.

In order to heat the several compartments I provide a heating system consisting of the radiators 30 which are fed by the pipes 31 and a main pipe 32. The individual pipes are controlled by the valves 33. So much of this heater as described is a permanent part of each unit. The heating apparatus of each unit may be connected as at 34 in order to connect the several units to one another. The whole heating apparatus is in turn connected to a hot water heater of any desired design, designated 35, which is equipped with the usual expansion tank 36.

The control of the hot water heater is carried out by a thermostat designated 37.

When it is desired to expand one unit into two, all that it is necessary to do is to remove the pair of side walls adjacent the partition 10 and insert between the partition 10 and those side walls a new unit connecting the fan shafts and the heating apparatus to one another, whereupon the apparatus will be ready for operation as before.

It will be understood that I desire to comprehend within my invention such modifications as may be necessary to adapt it to varying conditions and uses.

It will be further noted that the fan blades or paddles are located between each tier of egg trays and extend a substantial portion of the depth of the trays so as to insure thorough movement of the air.

It will also be noted that it is possible to operate the revolving shaft at different speeds, according to the kind of eggs to be incubated.

One of the fundamental advantages of my invention over those previously known in the art is the method of incubating the eggs without moving the trays. It is unnecessary to disturb the trays in any way during the incubation period. It is noted that the supports for the egg trays are only fastened at the top and bottom of the compartment, thus eliminating not only construction difficulties but the expense of manufacture.

Having thus fully described my invention, what I claim as new and desire to secure by Letters Patent of the United States is:—

1. In an incubator, a compartment, means to heat the compartment, a plurality of trays in said compartment and means adjacent the walls of the trays for agitating the air to maintain a uniform temperature throughout the compartment and a screen around said trays forming a casing, open on one side towards the doors, and doors to said compartment so that the trays can be removed.

2. In an incubator, a compartment having insulated walls, a plurality of trays in said compartment, an actuating shaft passing transversely through said compartment, means for operating said shaft, fan blades mounted on said shaft closely adjacent said trays and means for heating said compartment, said fan blades being of sufficient length to be substantially as long as the trays are long and approximately as long as the height of the trays in order to create a mixing of the air adjacent substantially all of the trays and to agitate the air throughout the whole stack of trays, said heating means extending vertically adjacent the trays and adjacent the paths of the fan blades so that the heat therefrom may be evenly distributed.

3. In an incubator, a compartment having insulated walls, a plurality of trays in said compartment, an actuating shaft passing transversely through said compartment, means for operating said shaft, fan blades mounted on said shaft closely adjacent said trays and means for heating said compartment, said fan blades being of sufficient length to be substantially as long as the trays are long and approximately as long as the height of the trays in order to create a mixing of the air adjacent substantially all of the trays, said heating means extending vertically adjacent the trays and adjacent the paths of the fan blades so that the heat therefrom may be evenly distributed, and a screen surrounding said trays on three sides and interposed between the trays and the fan blades.

4. In an incubator, a compartment, air agitating means in said compartment to maintain a uniform temperature throughout the compartment, heating means in said compartment, and means to support a plurality of trays, one of the walls of said compartment being detachable so that a similar unit can be attached to the end from which the wall has been removed, means to connect the fan operating means in each compartment and means to connect the heating means in each compartment one with the other whereby any number of units may be added one to the other and the fan operating means and heating means can operate the apparatus in one or more units.

5. In an incubator, compartments, one side of which has a stationary wall and a removable outer wall, whereby upon the removal of the outer wall an additional unit compartment may be added, heating means in each compartment, air circulating means in each compartment and means for connecting said heating means and air circulating means so that they can be operated from common sources of heat and power when the units are joined together.

6. In an incubator, compartments, one side of which has a stationary wall and a removable outer wall, whereby upon the removal of the outer wall an additional unit compartment may be added, heating means in each compartment, air circulating means in each compartment and means for connecting said heating means and air circulating means so that they can be operated from common sources of heat and power when the units are joined together, each of said units having a plurality of supporting trays for eggs.

7. In an incubator, compartments, one side of which has a stationary wall and a removable outer wall, whereby upon the removal of the outer wall an additional unit compartment may be added, heating means in each compartment, air circulating means in each compartment and means for connecting said heating means and air circulating means so that they can be operated from common sources of heat and power when the units are joined together, each of said units having a plurality of supporting trays for eggs and said air circulating means being mounted upon and operated by shafts passing through said units transversely with the blades of the fans located closely adjacent to substantially all of the trays as the blades move from point to point.

8. In an incubator, compartments, one side of which has a stationary wall and a removable outer wall, whereby upon the removal of the outer wall an additional unit compartment may be added, heating means in each compartment, air circulating means in each compartment and means for connecting said heating means and air circulating means so that they can be operated from common sources of heat and power when the units are joined together, each of said units having a plurality of supporting trays for eggs and said air circulating means being mounted upon and operated by shafts passing through said units transversely with the blades of the fans located closely adjacent to substantially all of the trays as the blades move from point to point, and a three-sided screen surrounding said stacks of trays in each unit having portions interposed between the trays and the fan blades.

9. In an incubator, a compartment having spaced heat insulating walls, a supplementary stationary inner wall on one side of the compartment within the heat insulating walls, the heat insulating walls adjacent thereto being detachable to permit of another unit being joined thereto so that the stationary wall will separate the units.

10. In an incubator, a compartment having spaced heat insulating walls, a supplementary stationary inner wall on one side of the compartment within the heat insulating walls, the heat insulating walls adjacent thereto being detachable to permit of another unit being joined thereto so that the stationary wall will separate the units, air agitating means in each of the units, means to connect said air agitating means when the units are joined together, heating means in each unit, means to connect said heating means to one another so that they may be heated from a common source.

11. In an incubator, a compartment having spaced heat insulating walls, a supplementary stationary inner wall on one side of the compartment within the heat insulating walls, the heat insulating walls adjacent thereto being detachable to permit of another unit being joined thereto so that the stationary wall will separate the units, air agitating means in each of the units, means to connect said air agitating means when the units are joined together, heating means in each unit, means to connect said heating means to one another so that they may be heated from a common source, and heat insulating doors spaced from one another in each unit compartment, said air agitating means consisting of blades sweeping substantially the entire sides of the stacks of trays.

12. In an incubator, a compartment having spaced heat insulating walls, a supplementary stationary inner wall on one side of the compartment within the heat insulating walls, the heat insulating walls adjacent thereto being detachable to permit of another unit being joined thereto so that the stationary wall will separate the units, air agitating means in each of the units, means to connect said air agitating means when the units are joined together, heating means in each unit, means to connect said heating means to one another so that they may be heated from a common source, and heat insulating doors spaced from one another in each unit compartment, said air agitating means consisting of blades sweeping substantially the entire sides of the stacks of trays, said blades being placed at an angle to one another in each compartment in order to insure an irregular movement of the air and insure its uniform temperature.

13. In an incubator, a compartment, a stack of egg trays with spaces therebetween, stirrer blades adapted to move along the whole of one side of said trays to stir the air irregularly causing the air to be churned and pulsated between the trays in the openings therebetween throughout the whole stack of trays, and means for operating said stirrer blades.

14. In an incubator, a compartment, a stack of egg trays with spaces therebetween, stirrer blades located closely adjacent to and across the side of the trays so as to pass by the spaces between the trays whereby the air is churned and caused to pulsate between the whole stack of trays as it is pushed and pulled by the action of the stirrer.

15. In an incubator, a compartment, a stack of egg trays with spaces therebetween, stirrer blades as long as the length of the trays on either side of said trays so arranged that said blades will be staggered with respect to one another and not directly opposite to one another, means to operate said blades whereby the movement of the blades successively on either side past the spaces between the trays will cause the air to be irregularly churned and to pulsate in alternate directions between the whole stack of trays thereby stirring up the air irregularly and maintaining a uniform temperature.

16. In an incubator, a compartment, a stack of spaced trays, stirrers passing across the side of said trays across said spaces, heating means so located that it will heat the churned air as it pulsates in and out between the whole stack of trays.

17. In an incubator, a compartment, a stack of spaced trays, stirrers passing by the side of said trays across said spaces, heating means so located that it will heat the churned air as it pulsates in and out between the trays, and moisture apparatus located so as to be in the path of the air churned by the stirrers and pushed off of the ends thereof.

18. In a method of incubation, arranging the eggs in spaced layers and causing the air to pulsate in and out between the whole of said layers from the general supply of air outside of said layers whereby the air is churned throughout the whole stack of trays and the temperature thereof is maintained uniform.

19. In a method of incubation, heating an inclosed compartment, churning the air therein so that the air will move in irregular currents engaging the heating means, arranging the eggs in a plurality of spaced layers and causing the churned air to pulsate in and out between and through the whole of said layers whereby uniform temperature is maintained and the air is suitably mixed and heated.

20. In a method of incubation, heating an inclosed compartment, arranging the eggs in a plurality of spaced layers in said compartment, churning the air and causing the churned air to pulsate in and out between the whole of said layers whereby uniform temperature is maintained and the air is suitably mixed and heated, said churning of the air being so that in the course of its being churned it is moistened.

In testimony whereof, I affix my signature.

WHITNEY E. BUNDY.